3,130,243
SEPARATION OF HYDROCARBONS BY SILVER DIALKYL PHOSPHATES
Clarence L. Dunn, Oakland, Friedrich G. Helfferich, Berkeley, and Robert E. Meeker, Orinda, Calif., assignors to Shell Oil Company, New York, N.Y., a corporation of Delaware
No Drawing. Filed Aug. 21, 1962, Ser. No. 218,461
13 Claims. (Cl. 260—677)

This invention relates to an improved method for separating components of fluid hydrocarbon mixtures comprising at least one non-paraffin hydrocarbon. More particularly, it relates to a selective extraction process for extracting at least one non-paraffin hydrocarbon, such as an alkene, an alkadiene, an alkapolyene or an arene from a mixture thereof with a more saturated (paraffinic) hydrocarbon or an isomer thereof.

Various methods have been and are being used commercially and many others have been proposed for separations of this type. Thus, selective organic solvents such as phenol, nitrobenzene, furfural, diethylene glycol and sulfolane are used for the extraction of aromatics from non-aromatic hydrocarbons. Acetone and acetonitrile are used for the selective extraction (in extractive distillation) of olefins from paraffins (butenes from butane) and of diolefins from mono-olefins. Extensive use has been made of an aqueous cuprous ammonia acetate solution to separate butadiene from butenes. Sulfuric acid at selected concentrations has been used to extract aromatics from paraffins, of certain tertiary olefins from secondary olefins and of secondary olefins from paraffins.

It has long been known that $Ag^+$, $Cu^+$ and $Hg_2^{++}$ ions and certain complexes of the platinum group metals can form complexes with olefins. U.S. Patent 2,449,793 describes the use of silver phenol sulfonate in phenol and water or glycol for separating unsaturated hydrocarbons from mixtures containing them; U.S. 2,515,140 describes a similar use of water solutions of silver salts and an amine salt; while U.S. 2,913,505 describes the use of aqueous silver fluoborate or silver fluosilicate solutions for separating fluid olefin hydrocarbons from fluid hydrocarbon mixtures containing olefins.

There are five requirements to be met by a metal-containing extractant in order for it to be practical. First, the extractant should be immiscible, or substantially so, with liquid paraffins. Second, the metal concentration in the extractant should be high, to give substantial unsaturate uptake. Third, the metal-unsaturate complexes should be moderatley strong, namely, strong enough to give substantial unsaturate uptake, and yet weak enough to permit the unsaturate to be readily desorbed after the separation from the paraffins (saturates). Fourth, the extractant should be reasonably stable. Fifth, the extractant should not be too expensive.

Of the olefin-complexing metals hitherto described, $Hg_2^{++}$ forms complexes that are too strong for easy desorption, and the platinum-group metals are inordinately expensive. With the remaining compounds, namely, those of cuprous and silver, the principal difficulty is to achieve satisfactory chemical stability without overly impairing olefin-complex formation. Cuprous tends to be oxidized to cupric, which does not form olefin complexes; the monovalent state can be stabilized by ammonia or amines, but the partial complexing by these ligands reduces the mono-olefin affinity to an impractically low value. Silver, on the other hand, tends to be reduced to metallic silver; this inherent instability of the silver ion impairs the use of ordinary aqueous silver salts as extractants. Thus, none of the previously known metal extractants meets all of the specified requirements.

It has now been found that silver di(lower)alkylphosphates are especially useful, particularly when in aqueous solution, for the selective extraction of non-paraffins (including aromatics) from paraffins and for the separation of different non-paraffins, such as isomeric olefins. The silver dialkyl phosphate is preferably employed together with from 0.5 to 2 moles of free alkyl and/or dialkyl phosphoric acid per mole of silver dialkyl phosphate. The alkyl phosphoric acids alone are not effective to separate olefins from paraffins. In contrast to ordinary aqueous silver salts such as silver nitrate and silver tetrafluoroborate, which are strongly disassociated, the silver organo phosphates are only weakly dissociated complexes. The complex bond stabilizes the monovalent state of the silver.

The lower silver dialkylphosphates (with two to six alkyl carbons) are preferentially water-soluble and insoluble in paraffins. Their water solubility is increased by the presence of alkyl or dialkyl phosphoric acid or mixtures of these acids. The smaller the alkyl groups, the higher is the solubility in water and thus the extracting capacity; the compound with the smallest alkyl groups (silver dimethyl phosphate), however, is somewhat less stable than the silver methyl ethyl phosphate and the silver dialkylphosphates with larger alkyl groups. The higher silver dialkyl phosphates with more than six alkyl carbons are paraffin-soluble and thus are not suitable for liquid-liquid extraction, but they are selective sorbents for separating vapor mixtures of hydrocarbons containing non-paraffins. For this purpose the silver dialkyl phosphate may be conveniently supported on an inert particulate solid.

For use in aqueous solution, the silver dialkyl phosphates will usually contain from two to six alkyl carbon atoms, preferably from two to five; the alkyls may be the same or different with the largest containing four, preferably two, carbon atoms.

A number of silver dialkyl phosphates were prepared to demonstrate their utility in the invention. Various silver dialkyl phosphates with methyl, ethyl and n-propyl groups were prepared by refluxing $POCl_3$ with the respective alcohols (mole ratio $POCl_3$ to alcohol 1:5, or 1:2.5:2.5 when two different alcohols were used), heating in vacuum to remove excess HCl, excess alcohol, and any triesters formed, shaking the bottoms with $Ag_2O$, and removing undissolved solids by filtration. The products, which also contained excess alkyl phosphoric acids, were clear, colorless and somewhat viscous. They were soluble in water and practically insoluble in liquid paraffins. A cheaper way of preparation is from $P_2O_5$ and alcohol. The products obtained in this way, however, were less pure and slightly discolored. The best extractant of this class is silver methyl ethyl phosphate (AgMEP) which combines a relatively high solubility in water and a satisfactory stability. Analysis of a typical water solution of AgMEP product gave the following: 2.8 moles Ag per liter, 4.6 gram atoms P per liter, 3.9 moles $H^+$ per liter (phenol phthalein end point), density of 1.44 grams/liter. Concentrations of up to 3.4 moles Ag per liter can be obtained. The higher dialkyl phosphates (silver ethyl n-propyl phosphate, AgEPP, and silver diethyl phosphate, AgDEP) have lower solubilities.

Silver di-2-ethylhexyl phosphate (AgD2EHP), silver di-n-butyl phosphate (AgDBP) and silver di-n-propyl phosphate (AgDPP) were prepared by shaking the commercially available acids with stoichiometrically equivalent amounts of $Ag_2O$ and then removing undissolved solids by filtration. The products, which all contained excess alkyl phosphoric acids, were dark brown, highly viscous liquids which tended to solidify upon standing. "Thinners" can be added to increase their fluidity for greater ease in handling. For AgD2EHP the best thinners are liquid paraffins ($C_6$ plus) in amounts of 40% volume or more. For AgDPP, addition of 20% volume water gave excellent thinning action. The AgD2EHP extractant (with paraffin thinner) is practically insoluble in water and is soluble in paraffins and thus is not suitable for liquid-liquid extraction. However, on an inert granular solid, it separated hexene from hexane in a gas-liquid (on solid) separation. The AgDPP extractant, on the other hand, was only slightly soluble in liquid paraffins and thus is preferable for liquid-liquid extraction.

Solubility data for six of the silver dialkyl phosphates thus prepared (and for comparison that of disilver ethyl phosphate) are given in Table I, together with data on olefin capacities and olefin/paraffin separation factors of the saturated water-silver extractants at 20° C.

In order to demonstrate the utility of the silver dialkyl phosphates for the indicated separations, olefin-paraffin equilibria were measured with representative ones of the compounds, and with gaseous or liquid mixtures of ethane/ethene, n-butane/butene-1, and n-hexane/hexene-1. Most of the determinations were made at atmospheric pressure and 20° C. The results are summarized in Table I. The separation factors, defined by Separation factor
$$= \frac{[\text{olefin in extractant}] [\text{paraffin in hydrocarbon phase}]}{[\text{paraffin in extractant}] [\text{olefin in hydrocarbon phase}]}$$

(brackets indicate concentrations), are average values since the factors depend somewhat on the composition of the hydrocarbon mixture.

The following conclusions can be drawn from the results:

(1) The decrease of the chain length of the alkyl groups in the dialkyl phosphates has the desired effect of improving the solubility and thus the olefin capacity and reducing the paraffin affinity, thus increasing the olefin/paraffin separation factor.

(2) The olefin capacity (on a mole basis) decreases with increasing carbon number of the olefin. Yet, this effect is less pronounced with the silver dialkyl phosphates than with ordinary silver salts ($AgNO_3$, $AgBF_4$) of comparable concentrations.

(3) The capacity of AgMEP, the best silver dialkyl phosphate extractant, for $C_6$ olefins is considerably higher than that of aqueous 0° C. and 20° C. In general it is desirable to carry out the extraction at a temperature from 0° C. to 10° C., preferably about 5° C., and the regeneration (recovery) at a temperature of from about 20° C. to about 60° C., preferably from 30 or 40° C. to 50° C.

For practical reasons the aqueous extractant solution should be essentially saturated with the silver dialkyl phosphate, although the use of less than saturated solutions merely reduces the capacity of the solution for the olefins.

Extraction equilibria with $C_4$ and $C_6$ olefin-isomer mixtures with silver dialkyl phosphate extractants show that the isomers differ significantly in their affinity for the extractant. The sequence of decreasing affinity is cis-olefin=$\alpha$-olefin>tran-olefin>branched olefin ("branched olefin"=olefin with side chain at one of the carbon atoms involved in the double bond). The separation factors are:

$\alpha$-Olefin vs. cis-olefin _____ 0.9 to 1.0
$\alpha$-Olefin vs. tran-olefin _____ 2.5 to 3.5
$\alpha$-Olefin vs. branched olefin _____ 4 to 6

In connection with this, one week contact time with AgMEP at 20–25° C. gave no detectable double-bond migration or cis-trans isomerization with hexene-1 and hexene-2 isomers, and no detectable polymerization with isobutylene and n-hexenes.

The behavior of the silver dialkyl phosphates with di-olefins, cyclic olefins and aromatics is illustrated by the following representative results with AgMEP:

(1) Butadiene/butene-1 extraction gave a separation factor at 20° C. and atmospheric pressure of 2.4 in favor of butadiene.

(2) Cyclohexene/hexene-1 gave a separation factor of unity. Thus, there is apparently no significant difference in affinity between cyclic, cis-, and alpha-olefins of the same carbon number.

(3) Benzene/hexene-1 gave a separation factor of unity. Thus, aromatics have the same affinity as alpha-olefins of the same carbon number.

In order to show advantages in the use of silver dialkyl phosphates, a number of other metal compounds were investigated. Silver diethyl phosphite and propionate were not sufficiently soluble. Cupric dialkyl phosphates

*Table I*

SOLUBILITY CHARACTERISTICS, OLEFIN CAPACITIES, AND SEPARATION FACTORS OF SILVER EXTRACTANTS AT 20° C.

| Silver Compound | Solubility in— | | Solvent Used | Silver Conc., moles/ liter | Olefin Capacities, moles/liter | | | Olefin/Paraffin Separation Factors | | |
|---|---|---|---|---|---|---|---|---|---|---|
| | Paraffin | Water | | | $C_2^=$ | $C_4^=$ | $C_6^=$ | $C_2^=/C_2$ | $C_4^=/C_4$ | $C_6^=/C_6$ |
| AgD2HEP | High | None | n-Octane | 1.8 | 0.5 | | | 5 | | |
| AgDBP | Low | Low | Water | a<0.2 | <0.005 | | | | | |
| AgDPP | do | High | do | 2.4 | 0.8 | 0.7 | 0.4 | 40 | 14 | 9 |
| AgEPP | None | do | do | 2.7 | | 2 | | | 8 | |
| AgMEP | do | do | do | 2.9 | 1.0 | 0.7 | 0.4 | >1,000 | >1,000 | >1,000 |
| AgDMP | do | do | do | 4.4 | | | | | | |
| Ag₂EP | do | Low | do | a<0.1 | <0.05 | | | | | |
| AgBF₄ | do | Very High | do | { 11.5 / 3.0 } | 9.5 | 13 | { 12 / 0.3 } | >1,000 / >1,000 | 150 / >1,000 | 40 / >1,000 | a Solution is not stable at this concentration and turns cloudy upon standing.

$AgNO_3$ and about the same as that of the earlier "promoted" silver extractants (silver nitrate and/or phenol sulfonate with added phenol and/or butylamine).

It has been found that the temperature dependence of olefin uptake by silver dialkyl phosphates is such that only a relatively small increase in temperature is required to recover the olefin from the complex. Thus, the results show that for hexene-1 and AgMEP, heating of the extractant from 5° C. to 50° C. is sufficient for recovery of over 95% of the sorbed olefin; heating to 20° C. recovers about 70% of that which is sorbed at 5° C.; heating to 30° C. yields 82%. The temperature dependence of the olefin uptake is almost linear between and tetrafluoborates, cadmium tetrafluoborate and cyano and thiocyano complexes of nickel show no olefin selectivity, and cuprous dialkyl phosphates and tetrafluoborate were, despite precautions, oxidized to the inactive cupric compounds. Silver tetrafluoborate, $AgBF_4$, is the most promising of the previously known olefin-specific extractants, being very soluble in water and consequently having high olefin capacity, but it has the disadvantage of lower stability. Not only does silver precipitate upon standing, but HF is formed by hydrolysis of the $BF_4$ ion. Furthermore, for olefins from $C_5$ up, the selectivity of $AgBF_4$ becomes poor unless the extractant is diluted, which results in lower capacity than that of silver dialkyl phosphate. These comparisons are shown by data in Table I.

Although the results described hereinbefore have demonstrated the utility of silver dialkyl phosphates for the separation of lower paraffins and non-paraffins having carbon numbers up to six, and the invention is of greatest utility for such separations, the silver dialkyl phosphates are also useful for separating liquid hydrocarbons with higher carbon numbers. However, whereas with the lower olefins, AgMEP proved to be the best extractant of the group, silver di-n-propyl phosphate (AgDPP) is advantageously used in the separation of higher hydrocarbons.

With AgDPP and a liquid paraffin/olefin mixture of high carbon number, such as a mixture of 25 to 75% n-cetene and 75 to 25% n-dodecane (highest liquid n-paraffin), at below 5° C., three separate phases are formed; these are a paraffin-enriched phase containing some AgDPP and olefin, an essentially aqueous phase containing AgDPP, and an olefin-enriched phase containing AgDPP and some paraffin. A further feature of this separation is that when the paraffin-enriched phase is separated from the other two phases and these latter are heated together slightly to above 15° C., practically all AgDPP returns to the aqueous phase, and an olefin-enriched hydrocarbon phase is obtained. By contacting thereafter the aqueous AgDPP phase at above 15° C. with the paraffin-enriched hydrocarbon phase, most of the AgDPP present in the latter phase returns to the aqueous phase (essentially complete AgDPP return is achieved at 40° C.). This aqueous phase, now containing practically all AgDPP initially charged, may be cooled and recycled to provide a simple and effective separation process. Typical experimental results are shown in Table II, where the amounts of extractant, olefin, paraffin and the separate phases are relative volumes and the amounts of Ag are relative parts by weight showing its distribution between the three liquid phases initially formed by equilibration at 5° C. The olefin-rich product was obtained by warming the middle and lower phases together after separating the upper phase.

2 and/or from hexene-3; cis-hexene-2 from trans-hexene-2; hexadiene-1,5 from hexene(s) and/or hexanes; bicycloheptene from bicycloheptane; cycloheptatriene from methylcyclohexane; benzene from cyclohexane and/or hexanes; toluene from methylcyclohexane and/or dimethylcyclopentanes and/or heptanes; and styrene from ethyl benzene. This invention is also useful for the simultaneous separation of two or more olefinic hydrocarbons of different carbon numbers from fluid mixtures thereof with corresponding paraffins, such as ethylene and propylene from a mixture of $C_2$ and $C_3$ olefins and paraffins, butenes and amylenes from a $C_4$–$C_5$ hydrocarbon fraction of saturates and unsaturates from catalytically and/or thermally cracking a petroleum oil stock, and $C_5$-, $C_6$- and $C_7$-olefins from a $C_5$ to $C_7$ distillate cut of catalytic cracked gasoline. Other applications of the invention will be apparent from the foregoing description.

We claim as our invention:

1. A method for the selective extraction of a non-paraffin hydrocarbon from a fluid mixture thereof with another hydrocarbon which comprises contacting the mixture of hydrocarbons in fluid state with a silver dialkyl phosphate to selectively form a complex between the non-paraffin hydrocarbon and the silver dialkyl phosphate.

2. A method in accordance with claim 1, wherein the fluid mixture of hydrocarbons is a gaseous mixture.

3. A method in accordance with claim 1, wherein said another hydrocarbon is a paraffin hydrocarbon.

4. A method in accordance with claim 1, wherein the mixture of hydrocarbons is a mixture of essentially olefin and paraffin hydrocarbons.

5. A method in accordance with claim 1, wherein the mixture of hydrocarbons is a mixture of essentially isomeric olefins of the same carbon number.

6. A method in accordance with claim 1, wherein the silver dialkyl phosphate contains from two to six alkyl carbon atoms and is in solution in water.

7. A method in accordance with claim 6, wherein the water solution of silver dialkyl phosphate contains from

*Table II*

EXTRACTION WITH AgDPP AND OLEFIN RECOVERY

| Extractant, Vol. | Feed | | Layer | Vol. | Composition | | | Olefin-Rich Product Recovered | |
|---|---|---|---|---|---|---|---|---|---|
| | $C_{16}^=$, Vol. | $C_{12}$, Vol. | | | Ag, v. | $C_{16}^=$, Percent v. | $C_{12}$, Percent v. | $C_{16}^=$, Vol. | $C_{12}$, Vol. |
| 1 | 1 | 2 | Upper | 2.9 | 0.12 | 32 | 67 | 0.074 | 0.056 |
| | | | Middle | 0.7 | 1.3 | <1 | 0 | | |
| | | | Lower | 0.4 | 1.6 | 17.5 | 14 | | |
| 2 | 1 | 1 | Upper | 1.4 | 0.25 | 44 | 53 | 0.20 | 0.14 |
| | | | Middle | 1.5 | 1.0 | <1 | 0 | | |
| | | | Lower | 1.1 | 1.66 | 18 | 13 | | |

It is thus seen that the present invention provides an advantageous method for the selective separation of a non-paraffin hydrocarbon, which may be an olefinic hydrocarbon, acyclic or alicyclic, including mono-, di- or poly-olefinic or an aromatic hydrocarbon, including alkylaromatics and alkenylaromatics, from fluid (liquid and/or gaseous) hydrocarbon mixtures thereof with another hydrocarbon, and especially such mixtures of hydrocarbons having the same carbon numbers. Exemplary of separations of such mixtures of lower hydrocarbons which are advantageously separated by the silver di(lower)alkyl phosphates, especially by aqueous solutions thereof, are the following: ethylene from ethane; propylene from propane; allene from propylene, various butylenes from the butanes (iso- and normal); butadiene from butenes; butadiene from butanes; n-butenes from isobutylene; pentenes from pentanes; isoprene from amylenes; cyclopentene from cyclopentane; hexenes from hexanes; methylcyclopentene from methyl cyclopentane; hexene-1 from hexene- 0.5 to 2.0 moles of alkyl and dialkyl phosphoric acids per mole of silver dialkyl phosphate.

8. A method in accordance with claim 7, wherein the hydrocarbon mixture is composed of hydrocarbons of from two to six carbon numbers.

9. A method in accordance with claim 8, wherein the silver dialkyl phosphate is silver methyl ethyl phosphate.

10. A method in accordance with claim 8, wherein the silver dialkyl phosphate is silver dimethyl phosphate.

11. A method in accordance with claim 8, wherein the silver dialkyl phosphate is silver di-n-propyl phosphate.

12. A method in accordance with claim 7, wherein the hydrocarbon mixture is composed of hydrocarbons of equal carbon number of from two to six and wherein the contacting is at a temperature of from about 0° to 10° C. and the resulting aqueous extract phase is separated and heated to a temperature of from about 30° to 60° C. to decompose the complex and liberate the complexed non-paraffin hydrocarbon.

13. A method for the production of paraffin-enriched and olefin-enriched fractions from a mixture of liquid paraffin and olefin hydrocarbons of carbon number greater than six which comprises intimately contacting said mixture at about 5° C. with a water solution of silver di-n-propyl phosphate to form three separate phases, separating the uppermost phase from the two others, warming the separated two other phases to at least 15° C. and forming a stratified olefin-enriched hydrocarbon phase and an aqueous phase, separating the aqueous phase from the olefin-enriched phase and mixing it with said separated uppermost phase and adjusting the temperature to at least 15° C. and forming a stratified paraffin-enriched phase and an aqueous solution of the silver di-n-propyl phosphate and separating them.

References Cited in the file of this patent

UNITED STATES PATENTS

| | | |
|---|---|---|
| 2,338,600 | Robey et al. | Jan. 4, 1944 |
| 2,378,216 | Haensel et al. | June 12, 1945 |